United States Patent [19]

Speranza et al.

[11] Patent Number: 5,098,986
[45] Date of Patent: Mar. 24, 1992

[54] PAIRED ALKYL PHENOL MANNICH CONDENSATES

[75] Inventors: George P. Speranza, Austin; Jiang-Jen Lin, Houston, both of Tex.

[73] Assignee: Texaco Chemical Company, White Plains, N.Y.

[21] Appl. No.: 615,103

[22] Filed: Nov. 19, 1990

[51] Int. Cl.$^5$ ............................................. C08G 8/16
[52] U.S. Cl. .................... 528/149; 528/162; 528/99
[58] Field of Search ................ 528/162, 94, 107, 149, 528/129, 210, 211, 212; 260/211, 570.5; 521/167

[56] References Cited

U.S. PATENT DOCUMENTS

| | | | |
|---|---|---|---|
| 2,802,820 | 8/1957 | Zech | 260/211 |
| 3,374,965 | 5/1973 | Becker | 260/570.5 |
| 4,485,195 | 11/1984 | Brennan et al. | 521/167 |
| 4,487,852 | 12/1984 | Brennan et al. | 521/167 |
| 4,489,178 | 12/1984 | Brennan et al. | 521/167 |
| 4,500,655 | 2/1985 | Brennan | 521/163 |
| 4,714,750 | 12/1987 | Grigsby et al. | 528/99 |
| 4,736,011 | 4/1988 | Waddill et al. | 528/111 |

OTHER PUBLICATIONS

The Mannich Reaction, *Org. Reactions*, I 303 (1942).

*Primary Examiner*—John Kight, III
*Assistant Examiner*—Richard Lee Jones
*Attorney, Agent, or Firm*—Jack H. Park; Kenneth R. Priem; Carl G. Ries

[57] ABSTRACT

Normally liquid polyfunctional final Mannich condensates that are useful as curing agents for epoxy resins are prepared by reacting a para $C_1$-$C_{15}$ alkyl phenol with formaldehyde and a first polyoxyalkylene diamine to form an intermediate Mannich condensate that is reacted, in turn, with formaldehyde and a second polyoxyalkylene diamine to form the final Mannich condensate, the first polyoxyalkylene diamine having the formula:

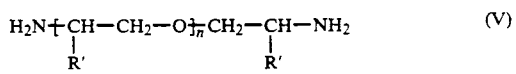

wherein:
n represents a positive number having a value of 1 to about 6, and
R' independently represents hydrogen or a methyl group, the second polyoxyalkylene diamine having the formula:

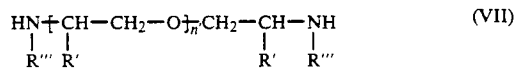

wherein
n and n' represent positive numbers having a value of 1 to about 6,
R' independently represents hydrogen or a methyl group, and
R''' represents an alkyl group containing 1 to 4 carbon atoms or a cyanoethyl group.

7 Claims, No Drawings

PAIRED ALKYL PHENOL MANNICH CONDENSATES

BACKGROUND OF THE INVENTION

1. Field of the Invention

This invention relates to Mannich condensates prepared from an alkyl phenol, formaldehyde and polyoxyalkylene diamines, as hereinafter defined.

More particularly, this invention relates to initial Mannich condensates prepared by reacting an alkyl phenol with formaldehyde and a first primary polyoxyalkylene diamine to provide intermediate paired alkyl phenol Mannich condensates which are further reacted with formaldehyde and a second polyoxyalkylene diamine, as hereafter defined, in order to provide the final Mannich condensates.

The intermediate Mannich condensates and the final Mannich condensates are useful as epoxy resin curing agents.

Prior Art

The Mannich reaction is a well-known reaction which has been extensively reviewed in the literature. See, for example, "The Mannich Reaction", *Org. Reactions* 1, 303 (1942) and "Advances in the Chemistry of Mannich Bases", "Methods in Synthetic Organic Chemistry-Synthesis", *Academic Press,* pp. 703–775, 1973.

Brennan et al. U.S. Pat. No. 4,485,195 discloses Mannich condensates prepared by reacting an alkyl phenol with formaldehyde, diethanolamine and a minor amount of melamine to provide products which can be alkoxylated for use in the preparation of fire retardant, rigid polyurethane foams.

Other Mannich condensates prepared by reacting alkyl phenols with formaldehyde and alkanolamines and melamine are disclosed in Brennan et al. U.S. Pat. No. 4,487,852, Brennan U.S. Pat. No. 4,489,178 and Brennan U.S. Pat. No. 4,500,655.

Waddill et al. U.S. Pat. No. 4,736,011 discloses Mannich condensates prepared by the reaction of an imidazole with formaldehyde and a polyoxyalkylene polyamine which are useful as curing agents for epoxy resins.

Becker U.S. Pat. No. 3,734,965 discloses phenolic resins prepared by condensing a polyoxypropylenepolyamine with phenol and an aldehyde.

Grigsby et al., in U.S. Pat. No. 4,714,750, describe the Mannich condensates prepared from 2,6-di-t-butylphenol, formaldehyde and a polyoxyalkyleneamine, i.e.:

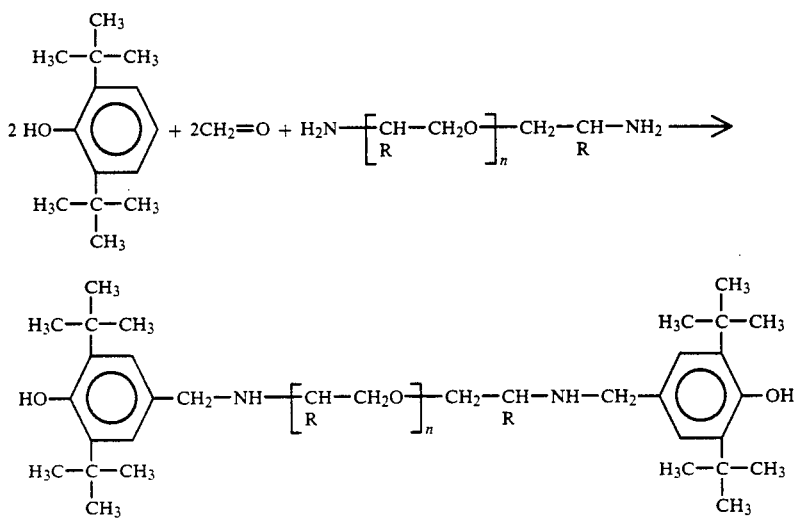

where: $R = H$ or $CH_3$, and $n = 1$ to 20.

SUMMARY OF THE INVENTION

It has been discovered in accordance with the present invention that initial Mannich condensates can be prepared by reacting an alkyl phenol with formaldehyde and a first polyoxyalkylene diamine, such initial condensates having the formula:

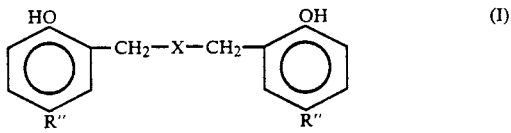

wherein:

R'' represents a straight chain or branched alkyl group containing from 1 to about 15 carbon atoms, and wherein X represents a polyoxyalkylene diamine group having the formula:

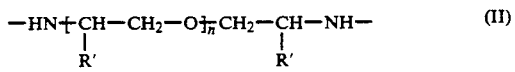

wherein:

n represents a positive number having a value of 1 to about 6, and

R' independently represents hydrogen or a methyl group.

It has been further discovered that "paired" initial alkyl Mannich condensates of the type illustrated above are liquid at ambient temperatures.

It has also been discovered in accordance with the present invention that polyfunctional final Mannich condensates can be prepared by reacting the initial Mannich condensate with formaldehyde and a second polyoxyalkylene diamine to provide final Mannich condensates having the formula:

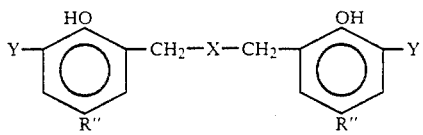 (III)

wherein Y represents a group having the formula:

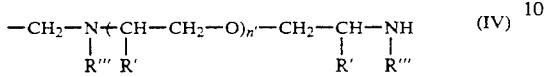 (IV)

wherein:

n' represents a positive integer having a value of 1 to 6,

R' represents hydrogen or a methyl group,

R''' represents hydrogen or an alkyl group containing from 1 to 3 carbon atoms or a cyanoethyl group, and wherein X represents a polyoxyalkylene diamine group having formula (II) given above.

DESCRIPTION OF THE INVENTION

The starting materials for the present invention are formaldehyde, a phenol having a $C_1$-$C_{15}$ alkyl group in the para position, a defined first class of polyoxyalkylene diamines and a defined second class of polyoxyalkylene diamines.

The First Class of Polyoxyalkylene Diamine Starting Materials

The first class of polyoxyalkylene diamine starting materials for the present invention are diamines having the formula:

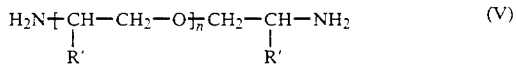 (V)

wherein:

n represents a positive number having a value of 1 to about 6, and

R' independently represents hydrogen or a methyl group.

Examples of polyoxyethylene diamine starting materials having this formula include a product made by Texaco Chemical Company under the tradename "Jeffamine EDR-148" wherein n has a value of about 2 and a polyoxyethylene diamine made by Texaco Chemical Company under the tradename "Jeffamine EDR-192" wherein n has a value of 3.

Another example of a group of polyoxyalkylene diamine starting materials are polyoxypropylene diamines having the formula:

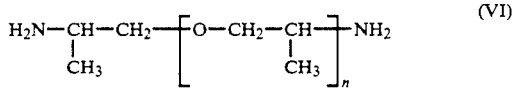 (VI)

wherein n represents a positive number having a value of 1 to about 6.

Examples of products of this formula include products sold by the Texaco Chemical Company under the tradename "Jeffamine D" including, for example, a product with the trade name "Jeffamine D-230" wherein the value of n has a value of about 2 to about 3 and a product sold by the tradename "Jeffamine D-400" wherein n has a value of from about 5 to about 6.

The Formaldehyde

Formaldehyde may be employed in any of its conventional forms. Thus, it may be, and preferably is, used in the form of an aqueous solution of formaldehyde such as "formalin" and may also be used in "inhibited" methanol solution as paraformaldehyde or as trioxane.

The Phenol Starting Material

The phenol starting material is a phenol having a $C_1$-$C_{15}$ alkyl group in the para position to the hydroxyl group of the phenol.

Representative examples of suitable phenols include compounds such as p-methyl phenol, p-ethyl phenol, p-propyl phenol, p-isopropyl phenol, the p-substituted n-butyl-, isobutyl- and tertiary butyl phenols, p-amyl phenol, p-decyl phenol, p-nonyl phenol, p-dodecyl phenol, p-pentadecyl phenol, etc. The phenols containing the larger alkyl groups are frequently prepared by reacting phenol with a dimer, trimer, tetramer or pentamer of propylene.

The Second Class of Polyoxyalkylene Diamine Starting Materials

The second class of polyoxyalkylene diamine starting materials to be used in accordance with the present invention are the polyoxyalkylene diamines of the formula:

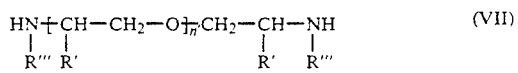 (VII)

wherein:

n' represents a positive number having a value of 1 to about 6,

R' independently represents hydrogen or a methyl group, and

R''' represents hydrogen or an alkyl group containing 1 to 4 carbon atoms or a cyanoethyl group.

An example of a group of polyoxyalkylene diamine starting materials are polyoxyethylene diamines having the formula:

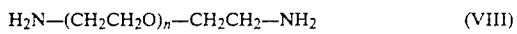 (VIII)

wherein n represents a positive number having a value of 1 to 6.

Examples of polyoxyethylene diamines having this formula include a commercial product made by Texaco Chemical Company under the tradename "Jeffamine EDR-148" wherein n has a value of about 2 and a polyoxyethylene diamine made by Texaco Chemical Company under the tradename "Jeffamine EDR-192" wherein n has a value of 3.

Another example of a group of polyoxyalkylene diamine starting materials are polyoxypropylene diamines having the formula:

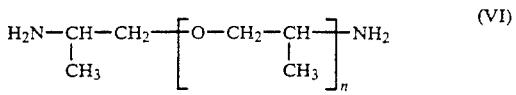 (VI)

wherein n represents a positive number having a value of 1 to about 6.

Examples of products of this formula include products sold by the Texaco Chemical Company under the tradename "Jeffamine D" including, for example, a product with the tradename "Jeffamine D-230" wherein the value of n has a value of about 2 to about 3 and a product sold by the tradename "Jeffamine D-400" wherein n has a value of from about 5 to about 6.

A further example of a group of polyoxyalkylene diamine starting materials are polyoxypropylene diamines having the formula:

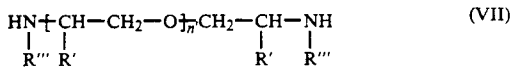

wherein:

n' represents a positive number having a value of 1 to about 6,

R' independently represents hydrogen or a methyl group, and

R"" represents hydrogen, an alkyl group containing 1 to 4 carbon atoms or a cyanoethyl group.

The isopropyl derivatives of polyoxyalkylene diamines having formula VII may be prepared, for example, by the method disclosed and claimed in Speranza et al. U.S. Pat. No. 4,927,912, which issued May 22, 1990, and is entitled "Secondary Isopropyl Amines Derived from Oxyalkylene Diamines and Triamines".

Another example of a useful polyoxypropylene diamine is a compound having the formula:

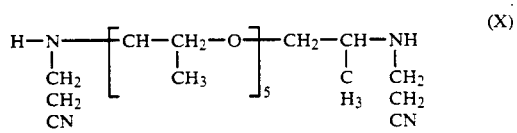

Preparation of the Initial Mannich Condensates

In accordance with the present invention, the initial Mannich condensate is prepared by reacting a para alkyl phenol with formaldehyde and a first polyoxyethylene diamine in the mole ratio of about 2:2:1 under Mannich reaction conditions including a temperature within the range of about 80° to about 150° C. for a period of time within the range of about 2 to about 8 hours.

Pressure is not critical. The reaction is suitably conducted at atmospheric pressure, although lower or higher pressures such as subatmospheric pressures or superatmospheric pressures of several atmospheres may be used. However, no particular advantage is obtained by using a reduced or an elevational pressure.

The resultant reaction product will contain, as a principal component, an initial Mannich condensate having the formula:

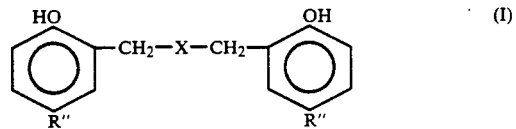

wherein:

R" represents a straight chain or branched alkyl group containing from 1 to about 15 carbon atoms, and X represents a polyoxyalkylene group having the formula:

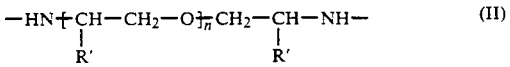

wherein:

n represents a positive number having a value of 1 to about 6, and

R' independently represents hydrogen or a methyl group.

Preparation of the Final Mannich Condensate

In accordance with the present invention, a final Mannich condensate is prepared by reacting the initial Mannich condensate with formaldehyde and a second polyoxyalkylene diamine in the mole ratio of about 2:2:1 under Mannich condensation reaction conditions such as those recited above including a temperature within the range of about 80° to about 150° C. and a reaction time within the range of about 2 to about 8 hours.

Pressure is not critical. The reaction is suitably conducted at atmospheric pressure, although lower or higher pressures such as subatmospheric pressures or superatmospheric pressures of several atmospheres may be used. However, no particular advantage is obtained by using a reduced or an elevated pressure.

The resultant reaction product will contain, as a principal component, a final Mannich condensate having the formula:

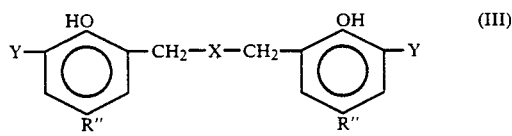

wherein:

Y represents a polyoxyalkylene group having the formula:

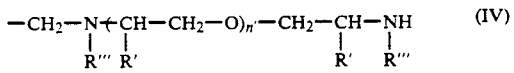

wherein:

n' represents a positive integer having a value of 1 to 6,

R' represents hydrogen or a methyl group, and

R''' represents hydrogen, an alkyl group containing from 1 to 4 carbon atoms or a cyanoethyl group.

We have found limitations to the method of synthesis of paired alkyl phenol Mannich condensates as disclosed herein and that the order of the addition of the reactants is very important.

For example, although the preparation goes well for bis-phenols:

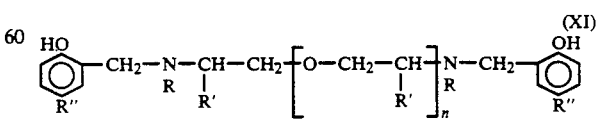

We have surprisingly discovered that the second step is very critical and that unexpected and unwanted results are obtained unless the diamine is a polyoxyethylene diamine of formula VIII.

For example, when R and R' equal hydrogen in formula (XI) above, the synthesis of the unique compounds of the present invention is performed with comparative ease. Thus, in Experiment 6641-45, the reaction proceeded as follows:

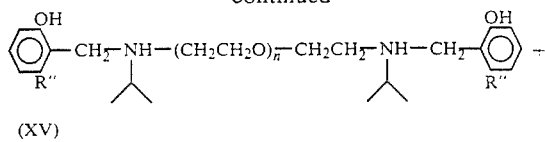

(XV)

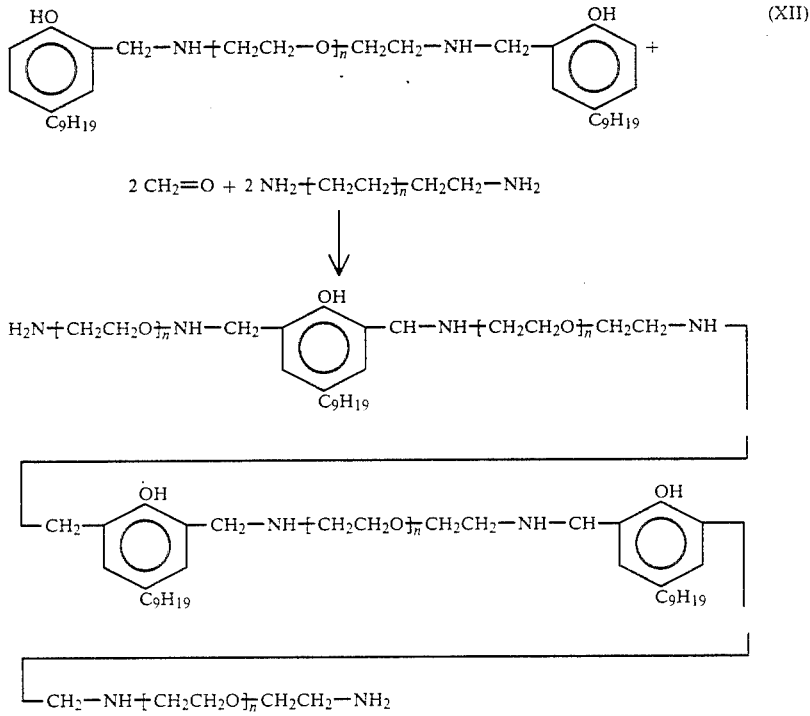

However, if the reactant of formula (II), above, is reacted with a much stronger amine such as diethylenetriamine, a significant "scrambling" takes place so that the amine of formula (II) is replaced to give products such as:

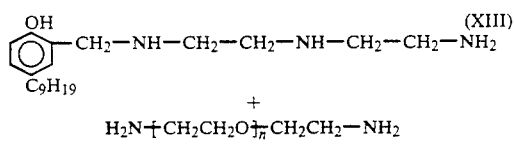

In a similar manner, if the bis-phenol is made from a dialkylpolyoxyalkylene diamine, the dialkylpolyoxyalkylene diamines are replaced with the unalkylated amine reactant. For example:

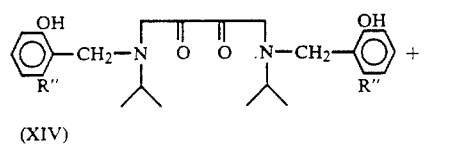

(XIV)

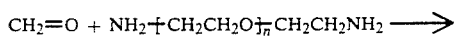

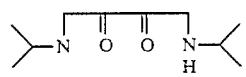

Utility of Mannich Condensates as Epoxy Curing Agents

The Mannich condensates of the present invention are well suited for use as curing agents for 1,2-epoxy resints.

It is known to use amines such as aliphatic or aromatic amines for curing 1,2-epoxy resins as shown, for example, by Waddill U.S. Pat. No. 4,139,524 and Marquis et al. U.S Pat. No. 4,162,358. See also, the textbook "Handbook of Epoxy Resins" by H. Lee and K. Neville, McGraw-Hill Book Company, 1967.

Generally the vicinal epoxide compositions that can be cured using the curing agents of this invention are organic materials having an average of more than one reactive 1,2-epoxide group. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals. halogenated phenyl groups and the like.

The most widely used epoxy resins are diglycidyl ethers of bisphenol A:

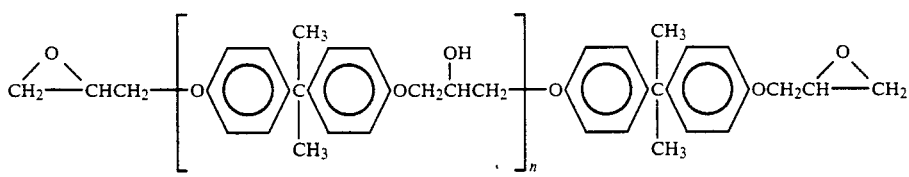

(XVI)

where n equals an integer of up to about 10 to 20.

However, these epoxides are representative of the broader class of epoxide compounds that are useful in making epoxy resins.

A widely used class of polyepoxides that can be cured according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylmethane, 4,4'-dihydroxydiphenylbutylphenylmethane, 2,2'-dihydroxydiphenylditolylmethane, 4,4'-dihydroxydiphenyltolylmethyl-methane and the like. Other polyhydric phenols which may also be co-reacted with an epihalohydrin to provide these epoxy polyethers are such compounds as resorcinol, hydroquinone, substituted hydroquinones, e.g., tert-butylhydroquinone, and the like.

Among the polyhydric alcohols that can be co-reacted with an epihalohydrin to provide the resinous epoxy polyethers are such compounds as ethylene glycol, propylene glycol, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as α-monothioglycerol, α,α'-dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides that can be cured by means of the above-described curing agents includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in H. Lee and K. Neville, "Handbook of Epoxy Resins".

It will be appreciated by those skilled in the art that the polyepoxide compositions that can be cured according to the practice of the present invention are not limited to the above described polyepoxides, but that these polyepoxides are to be considered merely as being representative of the class of polyepoxides as a whole.

The amount of curing agent that is employed in curing polyepoxide compositions will depend on the amine equivalent weight of the curing agent employed. The total number of equivalents of amine group is preferably from about 0.8 to about 1.2 times the number of epoxide equivalents present in the curable epoxy resin composition with a stoichiometric amount being most preferred.

Various conventionally employed additives can be admixed with these polyepoxide-containing compositions prior to final cure. For example, in certain instances it may be desired to add minor amounts of other co-catalysts, or hardeners, along with the curing agent system herein described. Conventional pigments, dyes, fillers, flame retarding agents and other compatible natural and synthetic resins can also be added. Furthermore, known solvents for the polyepoxide materials such as acetone, methyl ethyl ketone, toluene, benzene, xylene, dioxane, methyl isobutyl ketone, dimethylformamide, ethylene glycol monoethyl ether acetate, and the like, can be used if desired, or where necessary.

SPECIFIC EXAMPLES

The invention will be further illustrated by the following specific examples which are given by way of illustration and not as limitations on the scope of this invention.

Initial Mannich Condensate and the Preparation Thereof

A two-step synthesis involving different ratio of starting materials is used to make intermediate (A) and the final product (B), as illustrated by the general sturctures (A) and (B):

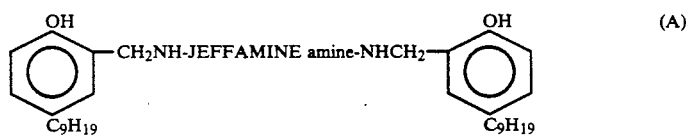

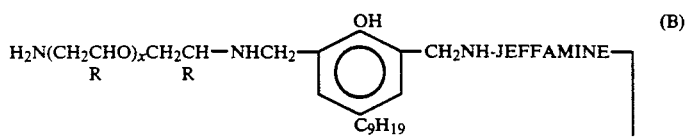

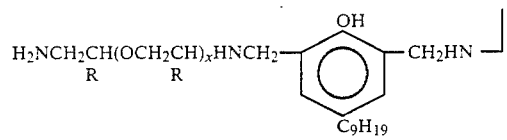

The examples of preparing (A) are cited in Example 1 and Table 1 and of preparing (B) in Example 2 and Table 2.

EXAMPLE 1 (6310-17)

Mannich Adduct of p-Nonylphenol, Formaldehyde and JEFFAMINE ® EDR-148

To a 1-liter, three-necked flask equipped with a thermometer, a dropping funnel, a stirrer and nitrogen-inlet line was charged p-nonylphenol (330g, 1.5M) and JEFFAMINE EDR-148 (111 g, 0.75M). Then, formalin (37%, 122 g, 1.5M) was added dropwise at ca. 50° C. over 1.5 hours period. During the addition, a slurry of a white solid was observed. The mixture was slowly heated to 100°–130° C. for 4.5 hours. During the process the generated water was removed through a Dean-Stark trap. The product was removed (439g) as a transparent, light-colored liquid. The analyses of total amine 3.4 meq/g (theoretical 3.3 meq/g). The viscosity was 4,000 cs/66° C. NMR spectra indicates the main product to be

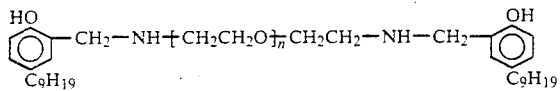

EXAMPLE 2

(6310-33) The Second Step of Mannich Adduct of Intermediate A from (6310-17) and JEFFAMINE ® EDR-148

In a 500 ml, three-necked flask equipped with a thermometer, a Dean-Stark trap, a stirrer and nitrogen-inlet line was charged the adduct (A) (from Example 1, 123 g, ca. 0.2M) EDR-148 (59.2 g, 0.4M). Then, formalin (37%, 32.4 g, 0.4M) was added dropwise under 80° C. The mixture was heated to 90°–110° C. for over 4 hours to remove water. The resulting product was analyzed to have 6.5 meq/g total amine (6.4 meq/g calcd) and viscosity of 12,000 cs/37.8° C. The product was a light-colored liquid.

In Table 1 the various intermediates (A) were prepared according to Example 1. The structures contain a secondary amine and two nonylphenol functionalities.

In Table 2, the intermediate A was used and the active amine terminated Mannich products were prepared according to Example 2. These compounds contain both primary and secondary amine groups.

EXAMPLE 3

(6310-33) Usage of Product

The sample of 6310-33 (11.5g) was mixed with EPON ® 828 (18.7 g) and poured into a mold and cured at 100° C. for overnight to give a rigid, hard material.

Following the procedure of Example 1 (6310-17), a series of intermediate Mannich reaction products were prepared. The products prepared and the properties thereof are shown in Table 1.

TABLE 1

SYNTHESIS OF INTERMEDIATE (A)

| Notebook No. | Moles | | | Product (A) | | |
|---|---|---|---|---|---|---|
| | Nonylphenol | Formaldehyde | Amine | Amine meq/g | (calc) | Description |
| 6310-17 | 2 | 2 | EDR-148 1 | 3.4 | (3.3) | Light colored liq. 4,000 cs/ 60° C. |
| 6310-18 | 2 | 2 | EDR-192 1 | 3.0 | (3.0) | Light colored liq. 2,000 cs/ 66° C. |
| 6310-11 | 2 | 2 | D-230 1 | 2.7 | (2.9) | Brown liquid 22,000 cs/ 50° C. |
| 6310-12 | 2 | 2 | D-400 1 | 2.1 | (2.3) | Brown liquid 4,000 cs/ 50° C. |

In like manner, a series of final Mannich condensates were prepared following the procedure of Example 2 (6310-33).

The starting materials used and the products obtained are set forth in Table 2.

TABLE 2

SYNTHESIS OF PRODUCT (B)

| Notebook No. | Moles | | | Product (B) | | |
|---|---|---|---|---|---|---|
| | (A) | Formaldehyde | Amine | Amine meq/g | (calc) | Description |
| 6310-33 | (6310-17) 1 | 2 | (EDR-148) 2 | 6.5 | (6.4) | Light colored liq. 12,000 cs/37.8° C. |
| 6310-34 | 1 | 2 | (EDR-192) 2 | 5.8 | (5.8) | Light colored liq. 7,000 cs/37.8° C. |
| 6310-29 | (6310-18) 1 | 2 | (EDR-148) 2 | 6.0 | (6.1) | Light yellow liq. 3,000 cs/50° C. |
| 6310-30 | 1 | 2 | (EDR-192) 2 | 5.5 | (5.6) | Light yellow liq. 2,000 cs/50° C. |
| 6310-25 | (6310-11) 1 | 2 | (EDR-148) 2 | 5.7 | (5.9) | Light brown liq. 5,000 cs/50° C. |
| 6310-26 | 1 | 2 | (EDR-192) 2 | 5.3 | (5.4) | Brown liquid 3,000 cs/50° C. |
| 6310-22 | (6310-12) 1 | 2 | (EDR-148) 2 | 4.9 | (5.0) | Brown liquid |

TABLE 2-continued

SYNTHESIS OF PRODUCT (B)

| Notebook No. | Moles (A) | Formaldehyde | Amine | Product (B) Amine meq/g | (calc) | Description |
|---|---|---|---|---|---|---|
| 6310-23 | 1 1 | 2 2 | 2 (EDR-192) 2 | 4.6 | (4.7) | 2,000 cs/50° C. Brown liquid 1,500 cs/50° C. |

EXAMPLE 4

(6310-47) Comparative Second Step, Mannich Adduct of Intermediate A from (6310-17) and Diethylenetriamine When the product of Example 1 (6310-17) was allowed to react with two moles of formalin and two moles of diethylenetriamine for about 5 hours at 85°-130° C., about 80 to 85% of the ortho positions had reacted. There was about a 50% replacement of the —NH—CH$_2$CH$_2$O by diethylenetriamine in the ortho position.

The foregoing examples are given by way of explanation and are not intended as limitations on the scope of the invention disclosed herein, as described in the appended claims.

We claim:

1. A normally liquid polyfunctional final Mannich condensate of a second polyoxyalkylene diamine, formaldehyde and an intermediate Mannich condensate, said final Mannich condensate having the formula:

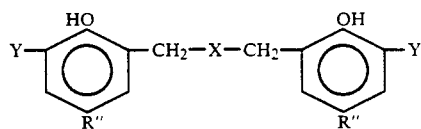

said second polyoxyalkylene diamine having the formula:

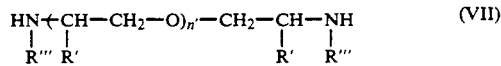

said intermediate Mannich condensate having the formula:

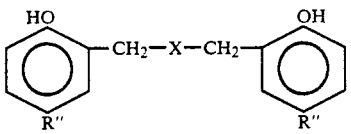

wherein X represents a polyoxyalkylene group having the formula:

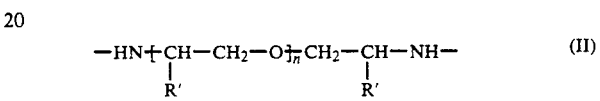

wherein Y represents a group having the formula:

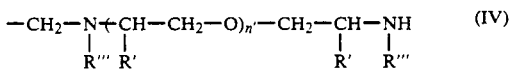

wherein:
- n and n' are positive numbers having a value of 1 to about 6,
- R' independently represents hydrogen or a methyl group,
- R" represents a straight chain or branched alkyl group containing from 1 to about 15 carbon atoms, and
- R'" represents hydrogen, as alkyl group containing 1 to 4 carbon atoms or a cyanoethyl group.

2. A normally liquid polyfunctional derivative as in claim 1 wherein R' represents hydrogen and R'" represents hydrogen.

3. A normally liquid polyfunctional derivative as in claim 1 wherein R' represents hydrogen and R'" represents an alkyl group containing 1 to 4 carbon atoms.

4. A normally liquid polyfunctional derivative as in claim 1 wherein R' represents hydrogen and R'" represents a cyanoethyl group.

5. A normally liquid polyfunctional derivative as in claim 1 wherein R' represents methyl and R'" represents an alkyl group containing 1 to 4 carbon atoms.

6. A normally liquid polyfunctional derivative as in claim 1 wherein R' represents methyl and R'" represents an alkyl group containing 1 to 4 carbon atoms.

7. A normally liquid polyfunctional derivative as in claim 1 wherein R' represents methyl and R'" represents a cyanoethyl group.

* * * * *